Nov. 29, 1938.  I. N. EUSTIS  2,138,484
MOUNTING MECHANISM FOR VEHICLE BODIES
Filed Jan. 22, 1937  3 Sheets-Sheet 1
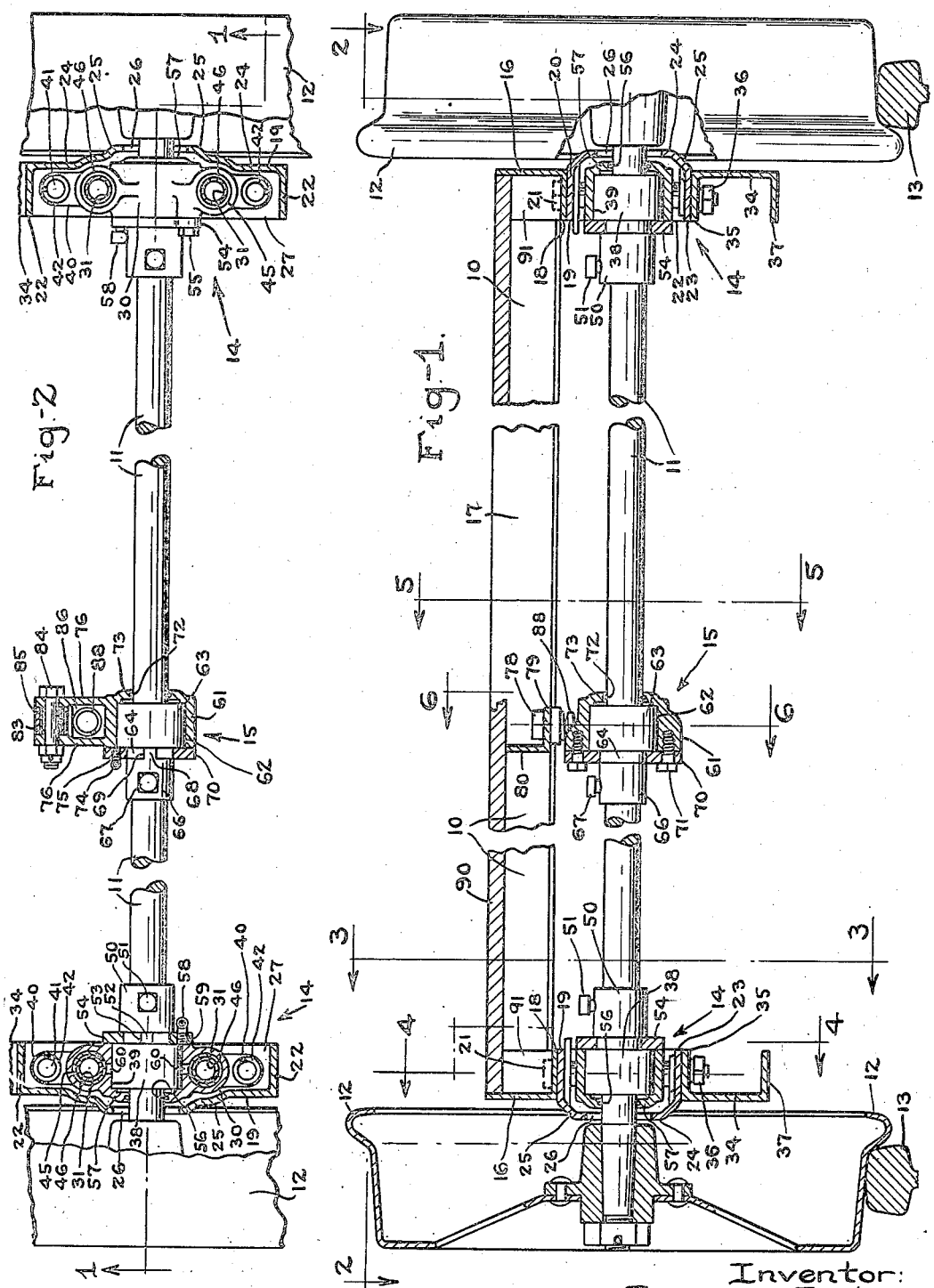
Inventor:
Irving N. Eustis.
By G. H. Braddock
Attorney.

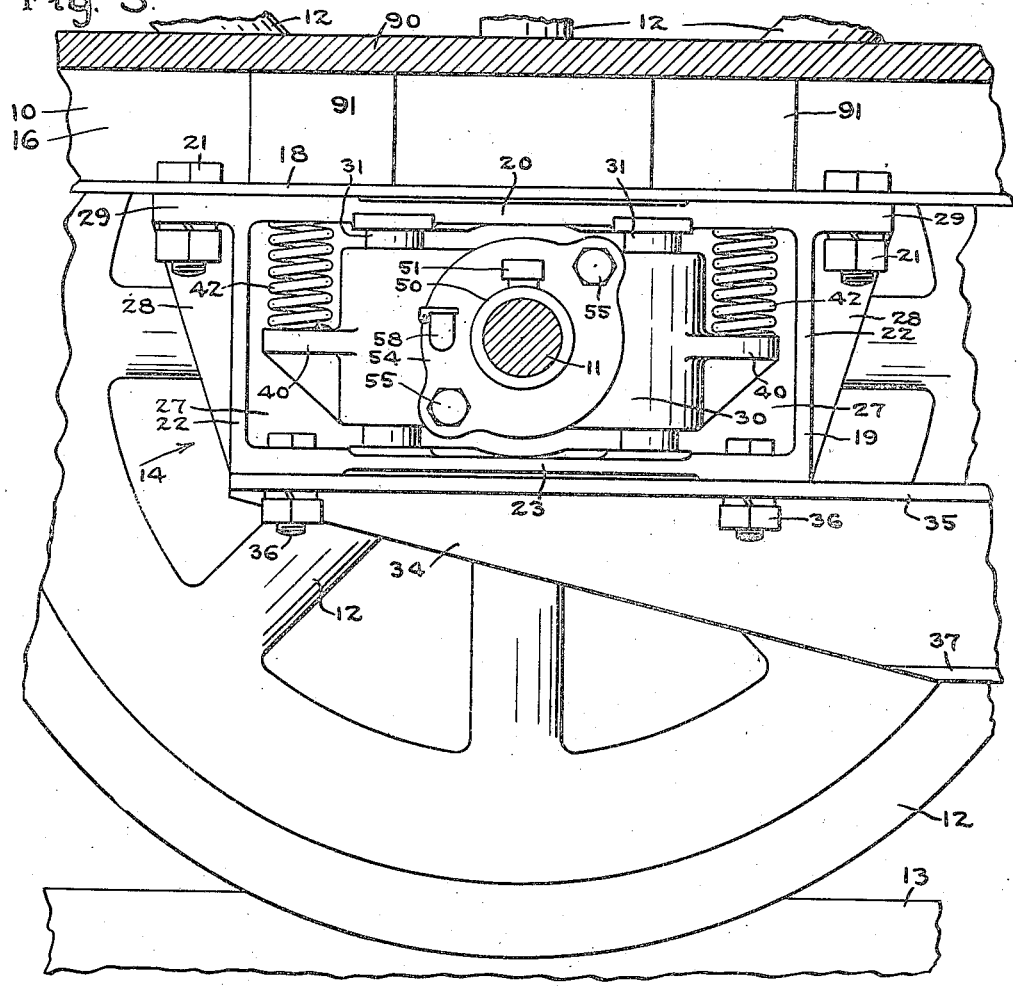

Nov. 29, 1938.                I. N. EUSTIS                 2,138,484
                MOUNTING MECHANISM FOR VEHICLE BODIES
                Filed Jan. 22, 1937          3 Sheets—Sheet 3

Inventor:
Irving N. Eustis.
By G. H. Braddock
Attorney.

Patented Nov. 29, 1938

2,138,484

UNITED STATES PATENT OFFICE 2,138,484

MOUNTING MECHANISM FOR VEHICLE BODIES

Irving N. Eustis, Fairmont, Minn., assignor to Fairmont Railway Motors, Inc., Fairmont, Minn., a corporation of Minnesota Application January 22, 1937, Serial No. 121,778

3 Claims. (Cl. 105—224)

This invention relates to mounting mechanism for the bodies or frames of various different types of vehicles or cars, but as disclosed herein the mounting mechanism has been designed to be especially suitable for employment in connection with so-called maintenance cars used on railways by workmen and/or inspectors for transportation and for carrying tools, etc.

An object of the invention is to provide mounting mechanism for vehicle or car bodies or frames wherein will be incorporated various improved features and characteristics of construction novel both as individual entities of the mounting mechanism and in combination with each other.

A further object is to provide novel and improved mounting mechanism for the bodies or frames of vehicles or cars designed with the end in view of obtaining durable, efficient and satisfactory operation or performance of the several different elements of the mounting mechanism, and particularly of those elements which provide the wearing surfaces of said mounting mechanism.

A further object is to provide mounting mechanism for vehicle or car bodies or frames which will include elements, and particularly wearing surface elements, of novel and improved construction adapted to the purpose of maintaining the axles of a vehicle or car in square with the body or frame thereof for an indefinitely long period of use.

A further object is to provide novel and improved mounting mechanism for the bodies or frames of vehicles or cars which will maintain the originally set relation between vehicle or car axles with traveling wheels and bodies or frames supported by said axles and wheels for substantially longer periods of time than have more or less similar vehicle or car body or frame mounting mechanisms of the prior art when put to the same use.

And a further object is to provide mounting mechanism for the bodies or frames of vehicles or cars which will be an improvement generally over mounting mechanism of the same general character heretofore of commerce.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a vertical, transverse sectional view of a vehicle or car, taken substantially as on line 1—1 in Fig. 2, disclosing mounting mechanism for the body or frame of said vehicle or car made according to the invention;

Fig. 2 is a horizontal, transverse sectional view of the vehicle or car of Fig. 1, taken substantially as on line 2—2 in said Fig. 1;

Fig. 3 is an enlarged sectional view, taken as on line 3—3 in Fig. 1;

Fig. 4 is an enlarged sectional view, taken as on line 4—4 in Fig. 1;

Figure 5:
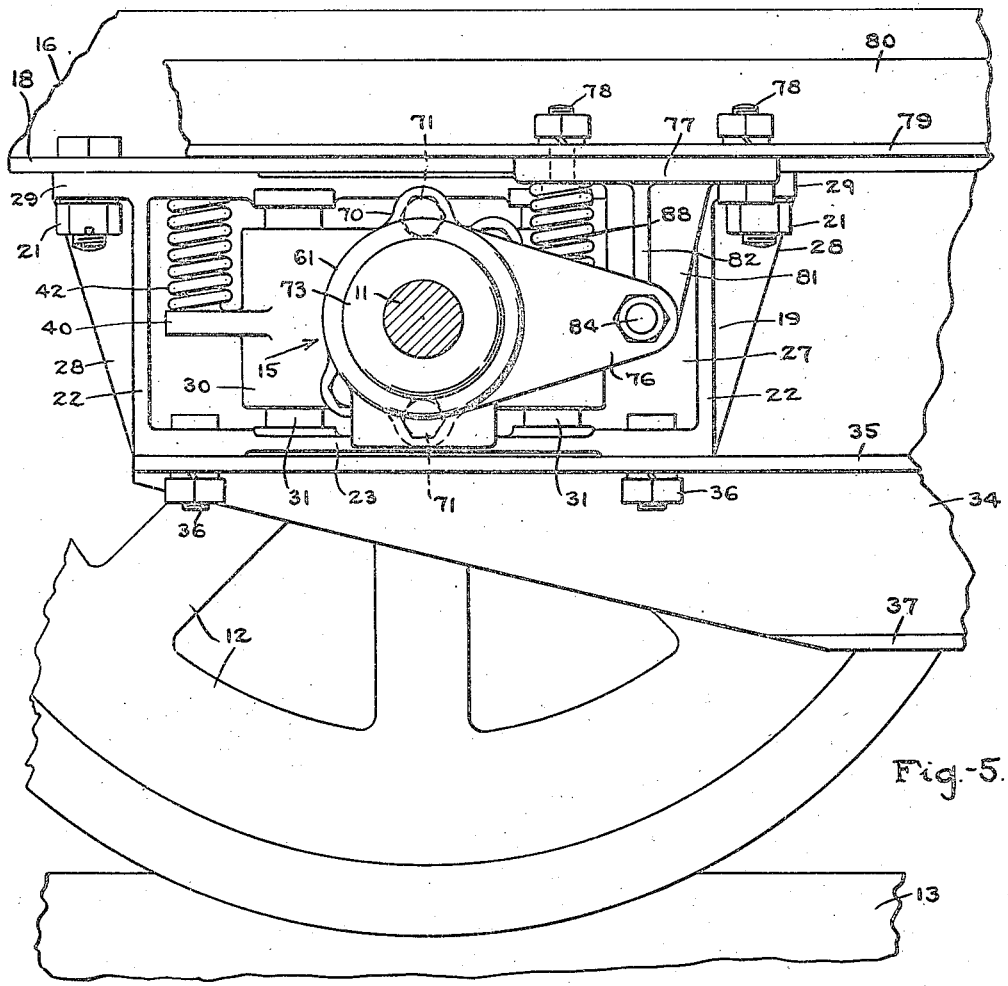
Fig. 5 is an enlarged sectional view, taken as on line 5—5 in Fig. 1.
Figure 6:
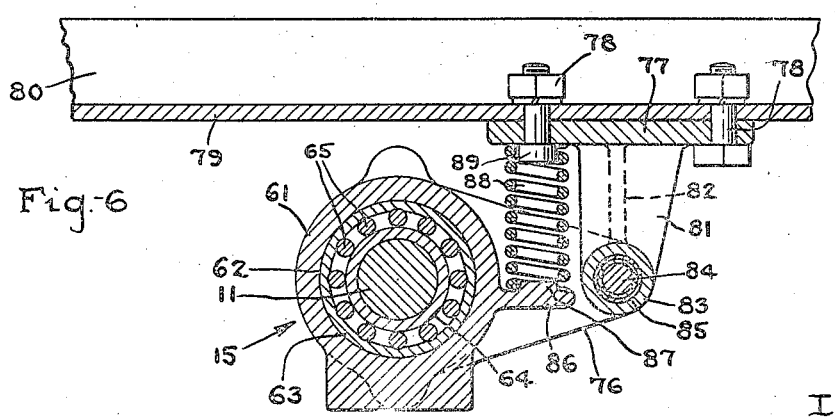
Fig. 6 is an enlarged sectional view, taken as on line 6—6 in Fig. 1.

With respect to the drawings and the numerals of reference thereon, 10 denotes the body or frame of a vehicle, which is a maintenance car as disclosed, supported through the instrumentality of the mounting mechanism of the invention by an axle 11 having traveling wheels 12. While only one axle 11 with traveling wheels 12 upon its opposite ends and at the opposite sides of the body or frame 10 is disclosed, it will be understood that the vehicle or car will ordinarily include a front and a rear axle 11 each with travelling wheels 12. In some instances an axle 11 may be driven, as by an electric motor (not shown), to propel the corresponding wheels 12, and in some instances an axle 11 may be rotated in its bearings by advancement of one or more of its wheels 12 when the vehicle or car is propelled, as along rails 13 of a railway. In a particular installation, some of the wheels 12 may be freely rotatable on the axles 11, and other wheels may be fixed to the axles to be propelled thereby.

The mounting mechanism which supports the body or frame 10 upon each axle 11 essentially consists of a right side and a left side mounting, both indicated 14, and may include an intermediate mounting 15.

The body or frame 10 includes spaced apart, parallel, longitudinally extending side frame members 16 and transversely extending end frame members 17 rigidly connected to each other. Only one of the end frame members 17 is shown. Each side frame member 16 includes an inwardly extending, horizontally disposed flange or sill 18 at the lower side thereof. The flanges or sills 18 are situated adjacent the opposite sides of the body or frame 10, and the wheels 12 are at the outer sides of the side frame members 16, in slightly spaced relation thereto as disclosed.

The right side and left side mountings 14 may be duplicates. Each of said mountings 14 includes a casting or member 19 of any suitable metal having a horizontal upper wall 20 bolted, as at 21, or otherwise secured, up against the lower surface of the flange or sill 18 at the corresponding side of the body or frame 10. Each casting 19 also includes spaced apart, parallel end walls 22 extending vertically downward from the horizontal upper wall 20, a horizontal lower wall 23 supported by said end walls 22 and disposed below the horizontal upper wall 20 in the vertical plane thereof, and a vertical outer wall 24 disposed generally longitudinally of the vehicle or car just at the outer side of and below a side frame member 16. That is to say, each casting 19 is a box-like member and includes oppositely disposed, horizontal upper and lower walls, denoted 20 and 23, respectively, oppositely disposed, vertical end walls 22 both integral with the upper and lower walls 20 and 23, and an outer wall 24 integral with all of the walls 20, 22, 22 and 23 and arranged just at the outer side of the frame member 16 at the corresponding side of the vehicle or car, in a vertical plane extending generally longitudinally of said vehicle or car. Each outer wall 24 may include curvilinear portions 25 at and adjacent to the locations where said end wall merges into the upper, side and lower walls of the casting or member 19, and the central part of each outer wall 24 is cut away, as at 26, to be in clearing relation to the axles 11. Also, the outer walls 24 and their curvilinear portions 25 may include additional cut-away portions (not shown) for the sake of economy and lighter construction. The inner side 27 of each casting 19 is open.

The castings or members 19 are so constructed that the horizontal upper and lower walls 20 and 23 thereof are rigidly located relatively to each other, and to the furtherance of this purpose, webs 28 which extend along the outer surfaces of the end walls 22 and are united with horizontal extensions 29 upon the opposite ends of each horizontal upper wall 20 may be provided. The horizontal extensions 29 carry the bolts 21 in the disclosure as made.

Each right side and left side mounting 14 includes an axle bearing housing 30 which is arranged within a corresponding casting or member 19 in spaced relation to the upper, lower, side and outer walls thereof. Each axle bearing housing 30 is mounted upon spaced apart, vertical guides 31, including a guide 31 at either side of the corresponding axle 11.

Each vertical guide 31 desirably may consist of a length of seamless tube of metal suitable to the purpose. The upper end portion of each seamless tube guide 31 is tightly mounted in an opening, denoted 32, through the horizontal upper wall 20 of the corresponding casting or member 19, and the upper end of each guide is fitted up against the horizontal flange or sill 18 upon the side frame member 16 at the corresponding side of the vehicle or car. The lower end portion of each seamless tube guide is tightly mounted in an opening, denoted 33, through the horizontal lower wall 23 of the corresponding casting or member 19.

The vehicle or car includes oppositely disposed, longitudinally extending side rails or rail skids, both denoted 34, which are disposed directly below the side frame members 16, 16, respectively. Each side rail or rail skid 34 includes an inwardly extending, horizontally disposed flange or sill 35 which is bolted, as at 36, or otherwise secured, up against the lower surface of a lower wall 23 at the corresponding side of the vehicle or car. The body portion of each side rail or rail skid extends vertically downward from the horizontal flange or sill 35 thereof as disclosed, and the lower edge of said body portion of each side rail or rail skid supports an inwardly extending flange 37. The lower end of each seamless tube guide 31 is fitted down against the horizontal flange or sill 35 of the side rail or rail skid 34 at the corresponding side of the vehicle or car.

Each axle 11 includes a right and a left bearing, both denoted 38, and each of the axle bearings 38 is mounted in a bearing opening 39 extending in direction transversely of the vehicle or car through the axle bearing housing 30 of the corresponding mounting 14.

Each axle bearing 30 has spaced apart spring seats 40, including a spring seat 40 at a side of each vertical guide 31 opposite the bearing opening 39 of the corresponding axle bearing housing 30. Each spring seat 40 includes a boss 41 upon its upper surface, and the spring seats 40 support vertically arranged coil or compression springs 42. As disclosed, each vertical coil or compression spring 42 has its lower portion engaged against the upper surface of a spring seat 40 about the boss 41 thereof, and its upper end portion arranged in a spring locating opening 43 through the horizontal upper wall 20 of the corresponding casting or member 19 and engaged against the lower surface of the horizontal flange or sill 18 at the same side of the vehicle or car. As shown, each horizontal flange or sill 18 carries spring seating elements 44 upon its lower surface, including a spring seating element 44 for each coil or compression spring 42.

Each axle bearing housing 30 has spaced apart, vertical guide openings 45, including a vertical guide opening 45 for receiving each seamless tube guide 31. Each guide opening 45 is arranged between the bearing opening 39 and the adjacent spring seat 40 and coil or compression spring 42 of the corresponding axle bearing housing 30. That is to say, the coil or compression springs 42 of each mounting 14 are at the sides of the vertical guide openings 45 which are at opposite sides of a bearing 38.

The walls of the vertical guide openings 45 do not directly engage the vertical seamless tube guides 31. Instead, a guide bushing 46 is tightly fitted into each vertical guide opening 45 and is snugly arranged upon the corresponding vertical seamless tube guide 31 to be slidable longitudinally thereof. Desirably, the upper and lower ends of each guide bushing 46 terminate flush with the upper and lower surfaces, respectively, of the axle bearing housings.

It will be seen that the body or frame 10 is supported by the wheels 12 and their axles 11 through the instrumentality of the axle bearing housings 30 and the coil or compression springs 42, and that the floating axle bearings 38 resiliently support the weight of the body or frame of the vehicle or car through the medium of said springs 42. When the vehicle or car is in motion and the wheels 12 with their axles 11 are caused to bob up and down under the body or frame 10, or said body or frame is caused to bob up and down, the thrusts are taken by the coil or compression springs 42 and the vehicle or car obviously will ride easy. Furthermore, in response to thrusts and rebounds imparted to the coil or compression springs 42 and causing movements of the axles 11 and the body or frame 10 toward and away from each other, the axle bearing housings 30 and their guide bushings 46 will be caused to have vertical upward and downward movement along the guides 31. Said guides 31 and said bushings 46 are, as a consequence, subjected to considerable wear and tear.

The vertical seamless tube guides 31 and the vertical guide bushings 46 cooperate to maintain the floating bearings 38 upon the axles 11 and the body or frame 10 in the proper alinement to which originally set, so that said axles and said body or frame are in square with each other. The openings 32 and 33 in the horizontal upper and lower walls 20 and 23, respectively, preferably receive the upper and lower portions of the vertical guides 31 with a push fit. Said vertical guides are locked in position in the castings or members 19 between the horizontal flanges or sills 18 of the body or frame 10 and the horizontal flanges or sills 35 of the side rails or rail skids 34. Stated differently, the vertical guides 31 are positively clamped between the horizontal flanges or sills of the body or frame and of the side rails or rail skids, respectively, against any possibility of endwise movement of said vertical guides in the castings or members 19. The proper positioning and alinement of the vertical guides 31 can be easily and accurately accomplished, inasmuch as the positioning and alinement of said vertical guides is accomplished by machining operations upon the castings or members 19. And when the vertical guides are once positioned and alined, there is no liability or possibility of their displacement to the slightest extent relatively to said castings or members 19, as will be obvious.

The vertical guide bushings 46 are renewable or replaceable. Each of said vertical guide bushings 46 desirably has a push or press fit in its corresponding vertical guide openings 45. In the disclosure as made, the vertical guide bushings are constructed of an oil impregnated and oil absorbing material. A material suitable to the purpose which can be mentioned is a Chrysler product known as "Oilite", which product is, roughly, composed of copper, tin and graphite and has an oil content of approximately thirty percent.

Each axle bearing 38 as disclosed includes an outer annular element 47 mounted directly in the bearing opening 39 of the corresponding bearing housing 30, an inner annular element 48 within the outer annular element 47, and ball bearings 49 between said outer and inner annular elements 47 and 48. Each inner annular element 48 is arranged directly upon its axle 11. Collars 50, including a collar 50 adjacent each mounting 14, are fixed against rotation upon the axles 11, as by set screws 51. Each collar 50 has integral lugs 52 set inwardly from the periphery of the collar which are engaged in slots 53 in the adjacent end of one of the inner annular elements 48, whereby each of the inner annular elements 48 will be caused to rotate with its corresponding axle 11. A cover plate 54 for each axle bearing 38 is arranged upon a part of each inner annular element 48 extending inwardly beyond the corresponding axle bearing housing 30 and outer annular element 47, as well as about the lugs 52, between the corresponding axle bearing housing 30 and the end of the adjacent collar 50 which immediately surrounds said lugs 52. Each cover plate 54 is bolted, as at 55, or otherwise secured, against the axle bearing housing having the axle bearing 38 which said cover plate protects, and the cover plates 54 are also in proximate or contiguous relation to the collars 50. The bearing openings 39 are of reduced size at the outer sides of the axle bearing housings, but of sufficient size, as indicated at 56, to allow free passage of the corresponding axle 11. The arrangement provides, in the instance of each axle bearing housing 30, a portion 57 of said axle bearing housing surrounding an axle and confining the corresponding axle bearing 38 against movement outwardly of the vehicle or car. Inward movement of the axle bearings is limited by the cover plates 54, and said cover plates and the collars 50 cooperate to locate the axles 11 and the inner annular elements 48 of the axle bearings against transverse movement relatively to the vehicle or car. The arrangement is such that the cover plates 54 offer no interference to rotation of the axles 11, and the collars 50 and the axle bearings 38.

Each cover plate 54 conveniently supports an oil cup 58, and an oil inlet 59 leads from each oil cup 58 to the bearing opening 39 of the corresponding axle bearing housing 30. As disclosed more clearly in Fig. 2, each oil inlet 59 communicates with its bearing opening 39 at location adjacent the outer cylindrical surface of the annular element 47 of the axle bearing within said bearing opening. Oil placed in the cups 58 flows by gravity to the interiors of the axle bearing housings and causes all of the elements of the axle bearings 38 to be properly and constantly lubricated in a well known manner.

It has been stated hereinbefore that the vertical guide bushings 46 are constructed of an oil impregnated and oil absorbing material. Oil additional to that originally included in the content of said guide bushings 46 is fed to the guide bushings from the bearing opening 39 of each axle bearing housing 30. To this end, an oil port or passage, represented 60, leads from each bearing opening 39 through the corresponding axle bearing housing 30 to each vertical guide opening 45, so that a part of the oil which flows from the bearing cups 58 through the oil inlets 59 to the bearing openings 39 finds its way from said bearing openings 39 to the vertical guide bushings 46. Thus, oil placed in the cups 58 is eventually absorbed by the vertical guide bushings, and these cause the vertical guides 31 to be properly constantly lubricated. The oil ports or passages 60 are as disclosed situated diametrically opposite each other with respect to each bearing opening 39, and each oil port or passage 60 is horizontally disposed and communicates with its corresponding vertical guide opening 45 at about the midheight of said guide opening.

Mountings heretofore of commerce for the bodies or frames of vehicles or cars, and more or less similar to the mountings 14, have not always functioned efficiently. In particular, the wearing or sliding surfaces of the mountings of the prior art have not stood up properly under the requirements of use. While lubricant was provided for the wearing or sliding surfaces of the mountings heretofore employed, the only provision for the accomplishment of lubrication was by application of oil directly to said wearing or sliding surfaces from an oil can. In short order, the oil became dissipated and said wearing or sliding surfaces became improperly lubricated, with the net result that vertical guides, more or less similar to the vertical guides 31, of the mountings quickly became worn. The worn guides permitted the axles to go out of square with the bodies or frames of the vehicles or cars, and there was always liability of one or more of the worn vertical guides becoming stuck in vertical guide bushings, more or less similar to the vertical guide bushings 46, upon the guides. Obviously, sticking of any of the vertical guides in their vertical guide bushings precluded proper functioning of the resilient means, more or less similar to the coil or compression springs 42, directly supporting the bodies or frames of the vehicles or cars. In short, sticking of the vertical guides in their bushings made for hard riding, and sometimes caused said vertical guides to be displaced from their set positions.

Each mounting 14, as illustrated in the drawings and as hereinbefore fully described, has been designed and constructed with the purpose in view of overcoming all of the defects and deficiencies in mountings of a similar general nature heretobefore known. The vertical seamless tube guides 31 of each mounting 14 are definitely and accurately positioned in the casting or member 19 of said mounting which surrounds the corresponding axle bearing 38. The vertical guides 31 have a push fit in the openings 32 and 33 and are clamped between the body or frame 10 and the side rails or rail skids 34. The wear is taken by the renewable or replaceable vertical guide bushings 46 which are pressed into the floating axle bearing housings. Said guide bushings 46 are of oil impregnated and oil absorbing material and are arranged to receive lubricating oil from the axle bearings and the openings 39 therefor by the provision of the oil ports or passages 60. The vertical bushings 46 absorb oil from the axle bearing housings 30 and keep the vertical guides 31 well lubricated at all times.

The coil or compression springs 42 are at the outer sides of the vertical guides and bushings. Said springs as thus situated have good leverage upon the axle bearing housings and are entirely capable of effectively absorbing all vibrations between the axles and the bodies or frames of vehicles or cars.

The several different elements of each mounting 14, and especially those elements of the mountings which provide the wearing or sliding surfaces, perform their intended services or functions in durable, efficient, satisfactory, and really ideal manner. The mountings 14 in cooperation with each other maintain the axles of a vehicle or car in connection with which used in square with the body or frame of said vehicle or car for an indefinitely long period of use. By employment of mountings, such as 14, made according to the invention, the bodies or frames of vehicles or cars can be maintained in the positions to which originally set relatively to the axles and traveling wheels of said vehicles or cars for substantially or considerably longer periods of time than have bodies or frames of vehicles or cars supported by mounting mechanisms of the prior art been maintained in their originally set positions when subjected to equivalent wear and tear under the same conditions of use.

The construction and arrangement of each mounting 14 makes provision for employment of guide bushings each having much larger bearing or wearing or sliding surface than was possessed by guide bushings for the same purpose of the prior art constructions and arrangements. In addition to other obvious advantages possessed by bearing or wearing or sliding surfaces of increased area in mountings of the present nature, a very important advantage is the greatly increased facility with which proper lubrication of the larger bearing or wearing or sliding surfaces can be accomplished.

The intermediate mounting 15 which supports the body or frame 10 upon each axle 11 includes an axle bearing housing 61 having a bearing opening 62. An axle bearing for each opening 62 includes an outer annular element 63 mounted directly in the bearing opening, an inner annular element 64 within the outer annular element 63, and ball bearings 65 between said outer and inner annular elements 63 and 64. Each inner annular element 64 is arranged directly upon its axle 11. Collars 66, including a collar 66 adjacent each mounting 15, are fixed against rotation upon the axles 11, as by set screws 67. Each collar 66 has integral lugs 68 which are engaged in slots 69 in the adjacent end of an inner annular element 64, whereby each of the inner annular elements 64 will be caused to rotate with its corresponding axle 11. A cover plate 70 for the axle bearing in each housing 61 is arranged upon a part of each inner annular element 64 extending beyond the corresponding axle bearing housing 61 and outer annular element 63, as well as about the lugs 68. Each cover plate 70 is bolted, as at 71, or otherwise secured, against the axle bearing housing 61 having the axle bearing which said cover plate protects. The bearing openings 62 are of reduced size at the sides of the axle bearing housings 61 opposite the cover plates 70, but of sufficient size, as indicated at 72, to allow free passage of the corresponding axle 11. The arrangement provides a portion 73 of each axle bearing housing 61 surrounding an axle and confining the corresponding bearing against movement laterally of the vehicle or car in direction away from the cover plate 70. Movement of the axle bearings in the housings 61 laterally of the vehicle or car in direction toward said cover plates 70 is limited by the cover plates themselves. The cover plates 70 offer no interference to rotation of the axles 11, the collars 66 and the axle bearings.

Each cover plate 70 conveniently supports an oil cup 74, and an oil inlet 75 leads from each oil cup 74 to the bearing opening 62 of the corresponding axle bearing housing 61. As shown in Fig. 2, each oil inlet 75 communicates with its bearing opening 62 at location adjacent the outer cylindrical surface of the annular element 63 of the axle bearing within said bearing opening. Oil placed in the cups 74 flows by gravity to the interiors of the axle bearing housings 61 and causes all of the elements of the axle bearings in said housings to be properly and constantly lubricated in a well known manner.

Each axle bearing housing 61 integrally supports spaced apart, parallel, horizontally disposed arms 76, including an arm 76 extending outwardly from location adjacent each end portion of said axle bearing housing. Brackets 77, one for each axle bearing housing 61, are bolted, as at 78, or otherwise secured, to a horizontal flange or sill 79 of a reinforcing member 80 of the body or frame 10. The reinforcing member 80 extends longitudinally of the vehicle or car as disclosed.

Each bracket 77 includes an ear 81 which extends vertically downward, and each ear 81 may include one or more reinforcing webs 82. The lower portion of each ear 81 is constructed to provide a bearing member 83, and each bearing member 83 is situated between the outer end portion of the spaced apart, parallel arms 76 upon the corresponding axle bearing housing 61, in contiguous or proximate relation to said arms 76. A headed and nutted bolt 84 for mounting each axle bearing housing 61 upon one of the brackets 77 passes through openings in the outer end portions of each set of spaced apart, parallel arms 76, as well as through the bearing member 83 between the arms 76 of the corresponding set. Each bearing member 83 includes one or more bushings 85 therein directly engaging the corresponding bolt 84 as disclosed.

Each axle bearing housing 61 includes a spring seat 86 at a side of the housing between its spaced apart, parallel arms 76, as well as between said housing and the corresponding mounting bolt 84. The spring seats 86 desirably may be about midway between the axle bearings in the housings 61 and the bolts or axes 84, at the approximate elevation of said bolts or axes. Each spring seat 86 includes a boss 87 upon its upper surface. Said spring seats 86 support vertically arranged coil or compression springs 88. As disclosed, each vertical coil or compression spring 88 has its lower end portion engaged against the upper surface of a spring seat 86 about the boss 87 thereof, and its upper end portion arranged against the corresponding bracket 77 and about the head 89 of one of the bolts 78.

It will be seen that the body or frame 10 is supported from the axles 11 through the instrumentality of the axle bearing housings 61 and the coil or compression springs 88, as well as by the axle bearing housings 30 and the coil or compression springs 42 in the manner as hereinbefore described. The floating axle bearings in the housings 61 assist in resiliently supporting the weight of the body or frame of the vehicle or car through the medium of said springs 88. When said vehicle or car is in motion, the coil or compression springs 88 assist the springs 42 in taking the thrusts, as will be obvious. As said springs 88 shorten and elongate, the axle bearing housings 61 oscillate upon the bolts or axes 84, toward and away from the body or frame 10.

A floor of the vehicle or car body or frame is represented 90. As disclosed, the floor is supported by the longitudinal reinforcing member 80, as well as by blocks 91 suitably positioned upon the body or frame 10.

What is claimed is:

1. In a vehicle, an axle with traveling wheels, a body, and a mounting for said body comprising a bearing upon said axle, a member rigid with said body and extending downwardly therefrom, said member including upper and lower spaced apart walls arranged in vertical alinement, a rail skid rigid with said member, vertical guide members secured in said upper and lower walls, respectively, and clamped between said body and said rail skid, said guide members being arranged at opposite sides of said axle, a housing for said bearing, vertical guide openings in said housing at opposite sides of said axle, a guide bushing fixed in each of said guide openings and slidable upon one of said vertical guide members, and means for resiliently supporting said body upon said housing.

2. In a vehicle, an axle with traveling wheels, a body, and a mounting for said body comprising a bearing upon said axle adapted to receive lubricant, a member rigid with said body and extending downwardly therefrom, said member including upper and lower rigidly spaced apart walls arranged in vertical alinement, a rail skid rigid with said member, vertical guide members secured in said upper and lower walls, respectively, and clamped between said body and said rail skid, said vertical guide members being arranged at opposite sides of said axle, a housing for said bearing, vertical guide openings in said housing at opposite sides of said axle, a guide bushing fixed in each of said guide openings and slidable upon one of said vertical guide members, compression springs upon said housing at the sides of said guide members opposite said axle supporting said body upon said housing, and means constituted as passages in said housing for conveying lubricant from said bearing to said bushings.

3. In a vehicle, an axle with traveling wheels, a body, and a mounting for said body comprising a bearing upon said axle, a member rigid with said body and extending downwardly therefrom, said member including upper and lower rigidly spaced apart walls arranged in vertical alinement, a rail skid rigid with said member, vertical guide members each having its upper and lower end portions, respectively, located in openings in said upper and lower walls, respectively, said vertical guide members having their opposite ends engaged with said body and said rail skid, respectively, and the vertical guide members being clamped between the body and rail skid, a housing for said bearing, vertical guide openings in said housing, a vertical guide bushing snugly arranged in each of said vertical guide openings and snugly seated upon each of said vertical guide members, said vertical guide members and said housing being relatively slidable, and means for resiliently supporting said body upon said housing.

IRVING N. EUSTIS.